United States Patent
Zhao

(10) Patent No.: US 10,241,271 B2
(45) Date of Patent: Mar. 26, 2019

(54) WINDPROOF COVER UNIT FOR OPTICAL FIBER FUSION SPLICER

(71) Applicant: INNO INSTRUMENT (CHINA) .INC, WeiHai (CN)

(72) Inventor: Yangri Zhao, WeiHai (CN)

(73) Assignee: INNO INSTRUMENT (CHINA) .INC, Weihai (CN)

( * ) Notice: Subject to any disclaimer, the term of this patent is extended or adjusted under 35 U.S.C. 154(b) by 82 days.

(21) Appl. No.: 15/250,696

(22) Filed: Aug. 29, 2016

(65) Prior Publication Data

US 2017/0307826 A1 Oct. 26, 2017

(30) Foreign Application Priority Data

Apr. 22, 2016 (CN) .......................... 2016 1 0253661

(51) Int. Cl.
*G02B 6/00* (2006.01)
*G02B 6/255* (2006.01)
*F21V 1/00* (2006.01)
*F21V 19/00* (2006.01)
*F21V 23/00* (2015.01)

(52) U.S. Cl.
CPC .............. *G02B 6/2553* (2013.01); *F21V 1/00* (2013.01); *F21V 19/0055* (2013.01); *F21V 23/001* (2013.01)

(58) Field of Classification Search
CPC ..... G02B 6/2553; F21V 1/00; F21V 19/0055; F21V 23/001
USPC .......................................................... 362/89
See application file for complete search history.

(56) References Cited

U.S. PATENT DOCUMENTS

2014/0075999 A1* 3/2014 Sasaki .................. G02B 6/2553
65/484
2015/0260935 A1* 9/2015 Williams .............. F21V 33/006
362/217.14

* cited by examiner

*Primary Examiner* — Bao Q Truong
*Assistant Examiner* — Meghan K Ulanday
(74) *Attorney, Agent, or Firm* — Anova Law Group, PLLC

(57) ABSTRACT

The present disclosure provides a windproof cover unit for optical fiber fusion splicer. The windproof cover unit includes a windproof cover, a mounting base unit, a flexible printed circuit (FPC) unit, and a rotational axle of the windproof cover, wherein the windproof cover comprises a protruding cover surface, an inner space, and a white-light lamp unit for providing illumination for the optical fiber fusion splicer in the inner space.

20 Claims, 10 Drawing Sheets

WINDPROOF COVER UNIT FOR OPTICAL FIBER FUSION SPLICER

TECHNICAL FIELD

The present invention generally relates to optical fiber fusion splicers and related parts, and in particular, to the design of a windproof cover unit for an optical fiber fusion splicer.

BACKGROUND

In an optical fiber fusion splicer, the white-light lamps are mainly for the providing illumination for optical fiber fusion, and are often designed at the front side or rear side of the optical fiber fusion splicer. Because it is often desired that the light provided by the white-light lamps illuminates on the ceramic V-shaped groove, the white-light lamps are placed at a higher position, which limits the overall dimensions of the optical fiber fusion splicer. The design of the windproof cover 1 is also limited.

Also, an existing optical fiber fusion splicer generally connects with the windproof cover 1 using an axle and an axle sleeve. Such method has no limit along the axial direction, and the windproof cover 1 moves and wobbles axially, disrupting the firmness and stability of the windproof cover 1 and the optical fiber fusion splicer.

In addition, the red-light lamps on the top cover of the optical fiber fusion splicer can function properly only when the flexible printed circuit (FPC) cable is connected with the main body of the optical fiber fusion splicer. In an existing optical fiber fusion splicer, the FPC cable is exposed on the outside. Such exposure of cable may affect the appearance and damage the FPC. In some other existing optical fiber fusion splicer, the FPC cable is configured with an independent cover. However, the independent cover often affects the overall appearance of the optical fiber fusion splicer and results in higher cost.

SUMMARY

The objective of the present disclosure is to provide a windproof cover unit for an optical fiber fusion splicer to overcome the above-mentioned defects in existing optical fiber fusion splicers. In other words, by using the disclosed windproof cover unit, the white-light lamps may be better configured, and movement of the windproof cover unit along its rotational axle may be prevented. In addition, with the disclosed windproof cover unit, the configuration of the FPC cable may be better arranged. Damages to the optical fiber fusion splicer may be prevented and the overall appearance of the optical fiber fusion splicer may be maintained.

The present disclosure provides a windproof cover unit for optical fiber fusion splicer. The windproof cover unit may include a windproof cover 1, a mounting base unit, a FPC unit 9, and a rotational axle 18 of the windproof cover 1. The windproof cover 1 may include a protruding cover surface and an inner space. A white-light lamp unit for providing illumination for the optical fiber fusion splicer may be placed in the inner space.

The white-light lamp unit may be arranged on the FPC unit 9. The FPC unit 9 may be configured between the mounting base unit and the inner space of the windproof cover 1. The FPC unit 9 may be fixed firmly inside the windproof cover 1 by the mounting base unit.

The mounting base unit may include a mounting base 2, two lampshades 4, a pressing device base 3, and two pairs of retaining screws 5 for the lampshades. The mounting base 2 may include a mounting plate 10 and two support frames 11. The mounting plate 10 may be placed between the two support frames 11. The mounting plate 10 may include different threaded holes. Some threaded holes may be configured to match the mounting holes on the inner surface of the windproof cover 1, and some other threaded holes may be configured to match the mounting holes on the lampshades 4. The mounting plate 10 may be configured with lampshade support frames 11 on both sides. The lampshades 4 may include mounting holes. The retaining screws 5 for the lampshades may connect and fix the lampshade support frames 11 with the lampshades 4 through the mounting holes. The pressing device base 3 may include mounting holes on the bottom to form a one-to-one correspondence with the threaded holes on the mounting plate 10. Thus, the pressing device base 3 may be fixed onto the mounting plate 10. The pressing device base 3 may also include two columnar parts with fastening fins in the center of the pressing device base 3. In an another embodiment, the parts with fastening fins in the pressing device base 3 may include a threaded rod in the center of the fastening fins. The threaded rod may fix the pressing device base 3 and the mounting base 2 onto the windproof cover 1 by another set of threaded holes on the mounting plate 10.

The FPC unit 9 may include a reinforcement plate unit 29 with several reinforcement plates. The reinforcement plates may support the FPC cable. The FPC cable may be connected with the red-light lamps 12 and the white-light lamps 13 emerged from the surfaces of the reinforcement plates. The reinforcement plate unit 29 may match and connect with the lampshade support frames 11 to jointly support and fix the white-light lamps 13 and the red-light lamps 12.

During assembly, the red-light lamps 12 and the white-light lamps 13 match with the mounting base 2 respectively. The pressing device base 3 may press on the mounting base 2 to fix and connect the lampshade support frames 11, the red-light lamps 12, the white-light lamps 13 and the mounting base 2 on the inner surface of the windproof cover 1. The lampshades 4 may be located in front of the red-light lamps 12 and the white-light lamps 13, i.e., the lampshades 4 may be firmly arranged in the inner space of the windproof cover 1 along with the red-light lamps 12, the white-light lamps 13, and the mounting base unit.

According to the windproof cover unit provided by the present disclosure, the FPC unit may include a FPC threading structure 14 with two parts. The first part may include a FPC baffle 15, and the second part may include a FPC winding sleeve 16 and a support frame 17 of the FPC threading groove. The two parts may be connected by the rotational axle 18 of the windproof cover 1.

The FPC baffle 15 may be inside the windproof cover 1 and may match with the sidewall of the windproof cover 1 by a certain interval to cover the FPC cable 19.

The support frame 17 of the FPC threading groove may include a fixed block and a circular block, connecting each other. The rotational axle 18 of the windproof cover 1 may pass through the center hole of the circular block during assembly.

The FPC winding sleeve 16 may be located between the FPC baffle 15 and the support frame 17 of the FPC threading groove. The FPC 16 may be enclosed by the fastening of the support frame 17 of the FPC threading groove and the FPC baffle 15. The FPC threading structure 14 may be configured inside the cover.

According to the windproof cover unit provided by the present disclosure, the FPC cable of the red-light lamps 12 on the windproof cover 1 may pass through the FPC baffle 15 and move along the FPC baffle 15. The FPC cable 19 may then move downward at the rotational axle 18 of the windproof cover 1 to connect with the main body of the optical fiber fusion splicer. The FPC cable 19 may move around the FPC winding sleeve 16 after passing through the FPC baffle 15 to move downward and connect with the main body of the optical fiber fusion splicer.

According to the windproof cover unit for optical fiber fusion splicer provided by the present disclosure, the unit may further include a set screw 23 of the windproof cover 1. The windproof cover 1 may include a location hole 20 of the windproof cover 1 near the inner side of the windproof cover 1, a threaded hole 21 of the windproof cover 1 near the outer side of the windproof cover 1 and on the same axle with the location hole 20 of the windproof cover 1, and a screw hole 22 of the windproof cover 1 configured perpendicularly to the threaded hole 21 of the windproof cover 1. The set screw 23 of the windproof cover 1 may be placed into the screw hole 22 of the windproof cover 1 and may match with the rotational axle 18 of the windproof cover 1 to fix the rotational axle 18 of the windproof cover 1 and keep the rotational axle 18 stable and undetached.

The rotational axle 18 of the windproof cover 1 may include a nut 25, a threaded part 26 in the middle of the rotational axle 18, a connection part between the nut 25 and the threaded part 26, and a guide part 27 facing the nut 25 and at the other end of the rotational axle 18 of the windproof cover 1. The rotational axle 18 of the windproof cover 1 may be configured at the left and right ends of the optical fiber fusion splicer, and the threaded part 26 of the rotational axle 18 of the windproof cover 1 may match with the threaded part 26 of the windproof cover 1. The guide part 27 of the rotational axle may match with the location hole on the rotational axle 18 of the windproof cover 1 to ensure the rotational axles 18 at both ends are aligned, i.e., to ensure axiality of the rotational axles.

The rotational axle 18 of the windproof cover 1 may include a step part on the inner side of the nut 25. The size of the step part may be designed with reference to the flange bearing. The step part may press the flange bearing without affecting the rotation of the flange bearing. The step part may be similar to a circular screw head hole, and such similarity enables the nut 25 of the rotational axle 18 of the windproof cover 1 to match with the flange bearing 24.

According to the windproof cover unit provided by the present disclosure, during assembly, the guide part 27 of the rotational axle 18 of the windproof cover 1 may pass through the support frame 17 of the FPC threading groove, the FPC baffle 15, and the FPC winding sleeve 16 consecutively, and may also be placed into the location hole 20 of the windproof cover 1. The present disclosure may provide a windproof cover unit for optical fiber fusion splicer. The FPC cable of the red-light lamps on the windproof cover 1 may pass through the FPC baffle and move along the FPC baffle, and further move downward at the rotational axle to connect with the main body of the optical fiber fusion splicer. The FPC cable may move around the FPC winding sleeve after moving through the FPC baffle to move downward and connect with the main body of the optical fiber fusion splicer.

The windproof cover unit for optical fiber fusion splicer in the present disclosure may have several advantages.

The white-light lamps of the optical fiber fusion splicer can be configured inside the windproof cover and the radiation angle of the white-light lamps can be designed according to the opening and closing angle of the windproof cover to simplify the design structure and operation of the white-light lamps as well as the structure of the optical fiber fusion splicer.

Further, by utilizing the threaded rotational axle, location hole, set hole and set axle with adjustable tightness designed by the present disclosure to match with the windproof cover, free adjustments of the tightness of the rotational axle of the windproof cover may be implemented. The stability of the rotation of the windproof cover when opening the cover may be ensured. The moving of the windproof along the axial direction may be prevented. The rotational axle of the windproof cover may be prevented from coming off. Thus, the stability and effectiveness of the windproof cover unit in long-term use may be ensured.

Further, by utilizing the FPC threading structure designed in the present disclosure to match with the windproof cover, the entire FPC threading structure may be arranged inside the cover, thus the FPC cable may be less susceptible to damages. The entire structure may be simple, convenient, and elaborately designed. No cover may be required for the FPC cable, and the appearance may be maintained without compromising the performance of the FPC cable.

DESCRIPTION OF DRAWINGS

The following is a further detailed description of the present disclosure with reference to the accompanying drawings.

DETAILED DESCRIPTION

The following is a further detailed description of the present disclosure with reference to the disclosed embodiments.

FIG. 1 to FIG. 9 depict the windproof cover unit for optical fiber fusion splicer and the related parts in the present disclosure.

Figure 1:
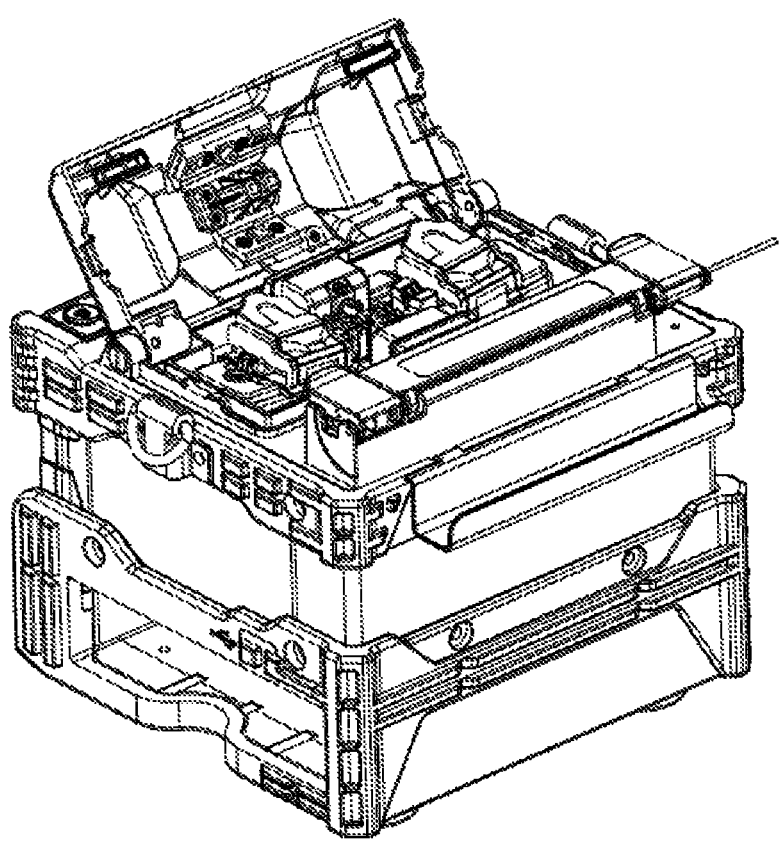
FIG. 1 illustrates an exemplary windproof cover unit consistent with the embodiments of the present disclosure.
Figure 2:
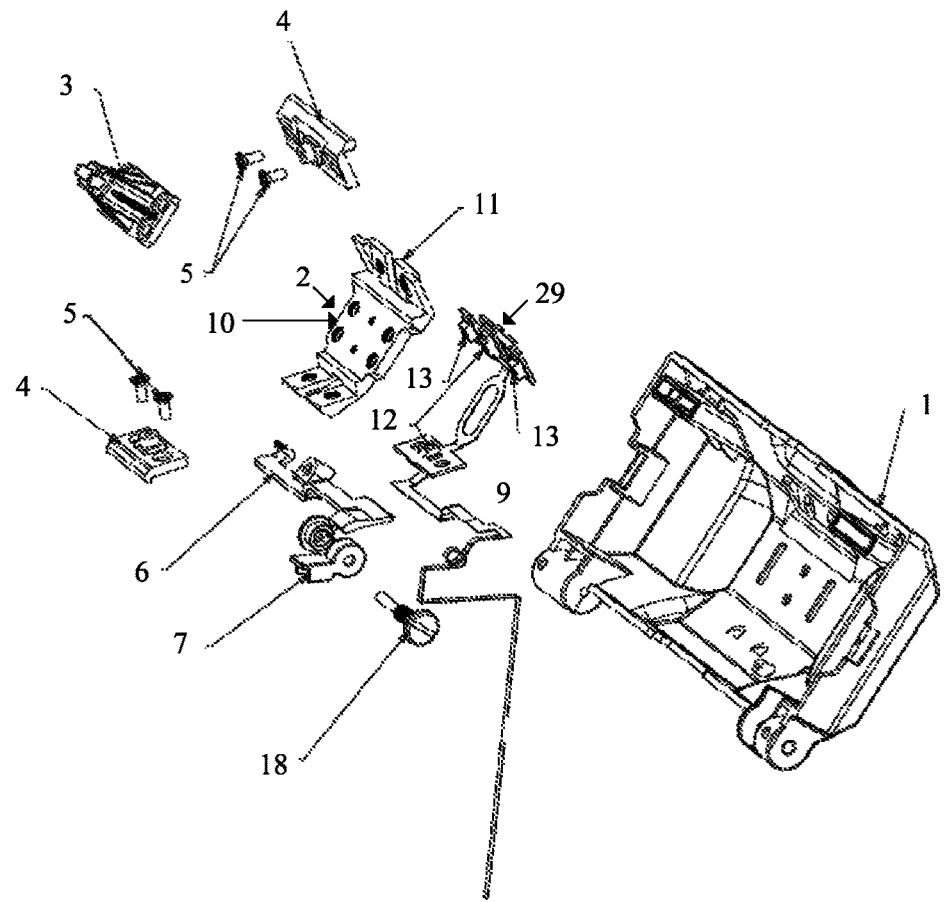
FIG. 2 illustrates different parts of an exemplary windproof cover unit consistent with the embodiments of the present disclosure.

First, with reference to FIG. 1 and FIG. 2, the present disclosure provides a windproof cover unit for optical fiber fusion splicer including a windproof cover 1, a mounting base unit, a FPC unit, and a rotational axle 18 of windproof cover 1. The windproof cover 1 may include a cover surface and an inner space. A white-light lamp unit for providing illumination for the operation of the optical fiber fusion splicer may be included. The white-light lamp unit may include two white-light lamps and a FPC cable for providing power supply. The FPC cable can be the same FPC cable for the red-light lamps (combined into a single cable with the FPC cable of the red-light lamps) or a FPC cable for the white-light lamps. The specific arrangement of the FPC cable should be determined according to different applications and designs and should not be limited by the embodiments of the present disclosure.

The white-light lamp unit may be configured on the FPC unit 9. The FPC unit 9 may be configured between the mounting base unit 2 and the inner space of the windproof cover 1, and may be fixed firmly inside the windproof cover 1 through the mounting base unit 2.

The mounting base unit may include a mounting base 2, two lampshades 4, a pressing device base 3, and two pairs of retaining screws 5 for the lampshades 4. The mounting base 2 may include a mounting plate 10 in the center and two lampshade support frames 11 on both sides of the mounting base 2. The lampshade support frames 11 and the mounting plate 10 may be firmly connected to each other and can be configured as a one-piece structure. The mounting plate 10 may include different threaded holes matching with the mounting holes on the inner surface of the windproof cover 1 and the mounting holes on the lampshades 4, respectively. The mounting plate 10 may include lampshade support frames 11 on both sides, and the lampshades 4 may include mounting holes. The retaining screws 5 for the lampshades may connect and fix the lampshade support frames 11 with the lampshades 4 through the mounting holes in the lampshades 4.

The pressing device base 3 may include mounting holes on the bottom. The mounting holes in the pressing device base 3 may form a one-to-one correspondence with the mounting holes in the mounting plate 10. Thus, the pressing device base 3 can be fixed onto the mounting plate 10 by the fastening structure. The pressing device base 3 may include two columnar parts with fastening fins in center of the pressing device base 3. In another embodiment, the parts with fastening fins may include a threaded rod in the middle. The threaded rod may fix the pressing device base 3 and the mounting base 2 onto the windproof cover 1 by another set of threaded holes on the mounting plate 10.

The FPC unit 9 may include a reinforcement plate unit 29, two red-light lamps 12, two white-light lamps 13, and a FPC cable supported by the reinforcement plate. The reinforcement plate unit 29 may include several reinforcement plates for supporting the FPC cable that is connected with the red-light lamps 12 and the white-light lamps 13 emerged from the surfaces of the reinforcement plates. The reinforcement plate unit 29 may include 4 reinforcement plates A, B, C and D. The reinforcement plates A and B may include the red-light lamps 12, i.e., the red-light lamps 12 emerge from the reinforcement plates A and B. The reinforcement plates C and D on the two sides of the reinforcement plate B may include the white-light lamps 13, i.e., the white-light lamps 13 emerge from the reinforcement plates C and D. Further, the reinforcement plate unit 29 may match and connect with the lampshade support frames 11 to firmly fix the red-light lamps, the white-light lamps 13, and the FPC cable.

During assembly, the red-light lamps 12 and the white-light lamps 13 match with the mounting base 2 respectively, and the pressing device base 3 presses on the mounting plate 10 of the mounting base to fix and connect the lampshade support frames 11, the red-light lamps 12, the white-light lamps 13 and the mounting base 2 to the inner surface of the windproof cover 1; the lampshades 4 are located in front of the red-light lamps 12 and the white-light lamps 13, i.e., the lampshades are firmly configured in the inner space of the windproof cover 1 along with the red-light lamps 12, the white-light lamps 13 and the mounting base unit.

Figure 3:
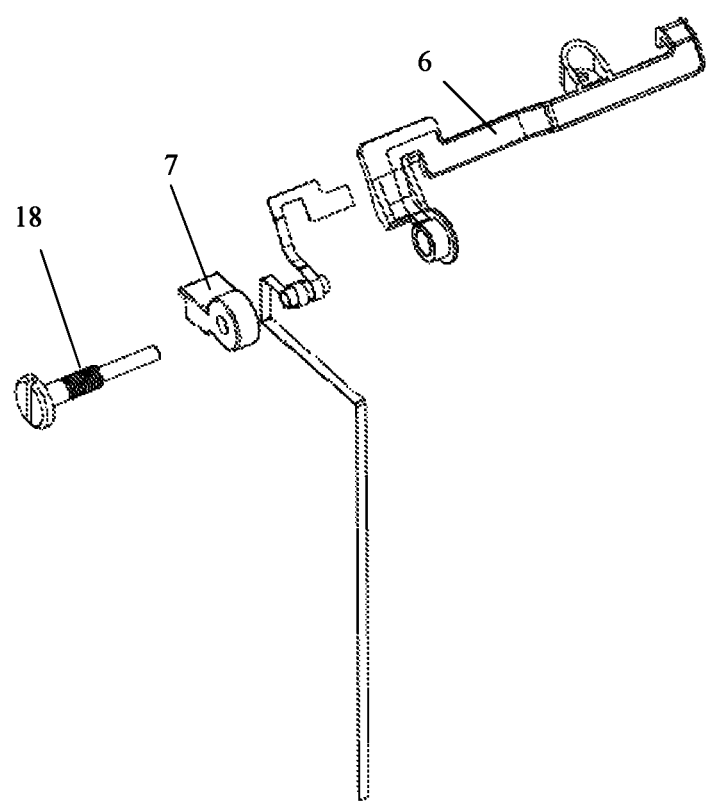
FIG. 3 illustrates an FPC unit and the rotational axle of the windproof cover unit consistent with the embodiments of the present disclosure.
Figure 4:
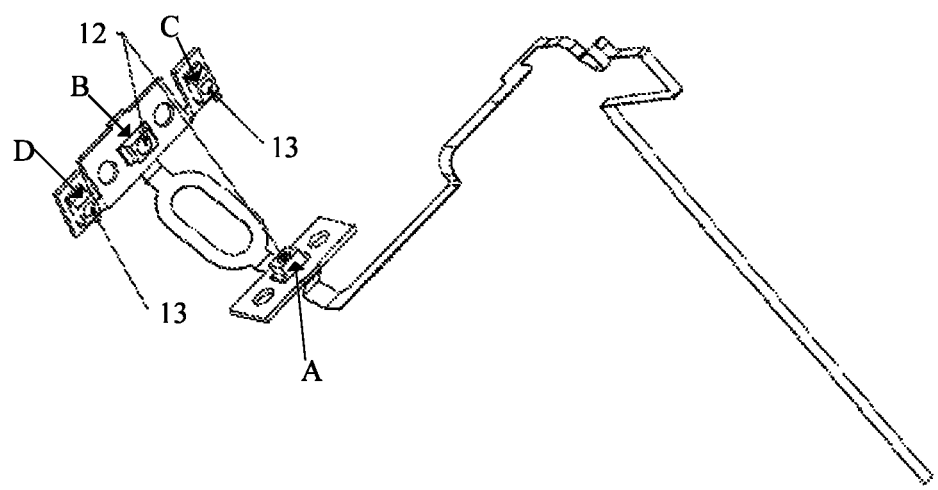
FIG. 4 illustrates the red-light lamps and the white-light lamps on an FPC unit of an exemplary windproof cover unit consistent with the embodiments of the present disclosure.
Figure 10:
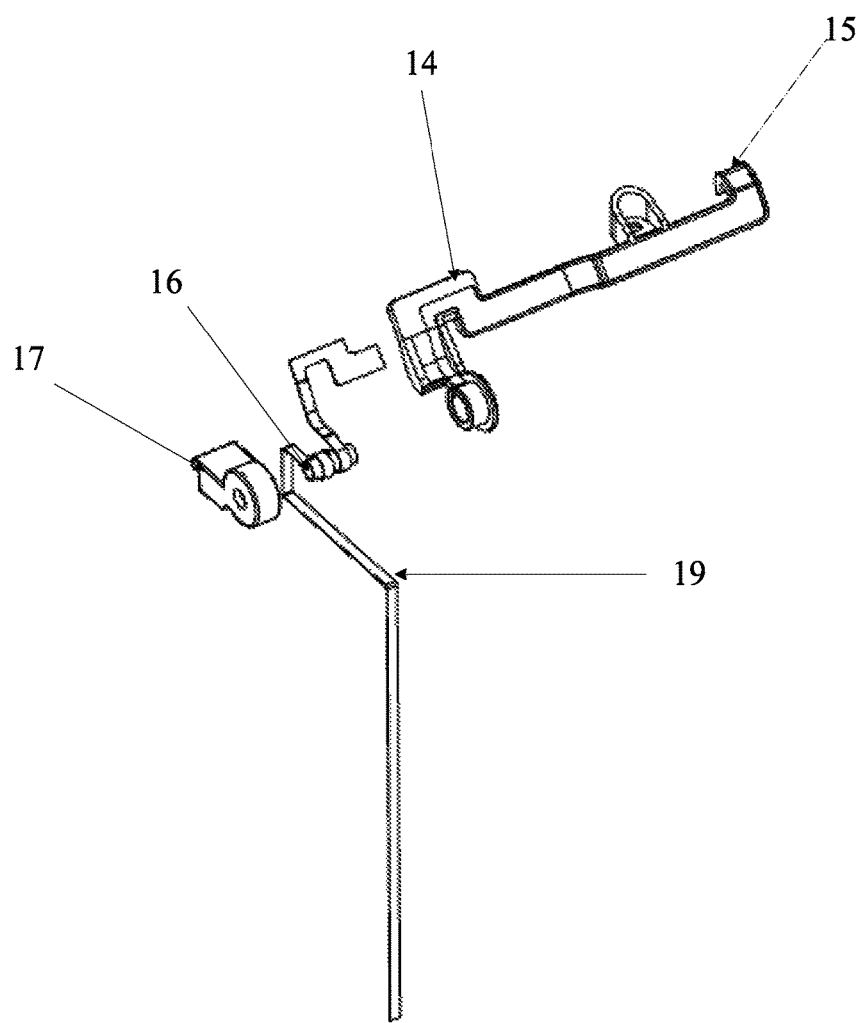
FIG. 10 illustrates a FPC unit of a windproof cover unit consistent with the embodiments of the present disclosure.

Further, with reference to FIG. 3, FIG. 4, and FIG. 10, according to present disclosure, the FPC unit may further include a FPC threading structure 14 with two parts. The first part may include a FPC baffle 15, and the second part may include a FPC winding sleeve 16 and a support frame 17 of the FPC threading groove. The two parts may be connected by the rotational axle 18 of the windproof cover 1.

The FPC baffle 15 may be configured inside the windproof cover 1 and may match with the sidewall of the windproof cover 1 by a certain interval to cover the FPC cable 19.

The support frame 17 of the FPC threading groove may include a fixed block and a circular block, connecting with each other. The rotational axle 18 of the windproof cover 1 may pass through the center hole of the circular block during assembly.

The FPC winding sleeve 16 may be located between the FPC baffle 15 and the support frame 17 of the FPC threading groove. The FPC winding sleeve 16 may be enclosed by the fastening of the support frame 17 of the FPC threading groove and the FPC baffle 15. The entire FPC threading structure 14 may be inside the windproof cover 1.

According to present disclosure, the FPC cable of the red-light lamps 12 on the windproof cover 1 may pass through the FPC baffle 15 and may move along the FPC baffle, and may further move downward at the rotational axle 18 of the windproof cover 1 to connect with the main body of the optical fiber fusion splicer. The FPC cable 19 may move around the FPC winding sleeve 16 after passing through the FPC baffle 15 to move downward and connect with the main body of the optical fiber fusion splicer.

As shown in FIG. 5 to FIG. 9, the present disclosure may further include a set screw 23 of the windproof cover 1. The windproof cover 1 may include a location hole 20 of the windproof cover 1 near the inner side of the windproof cover 1, a threaded hole 21 of the windproof cover 1 near the outer side of the windproof cover 1 and on the same axle with the location hole 20 of the windproof cover 1, and a screw hole 22 of the windproof cover 1 configured perpendicularly to the threaded hole 21 of the windproof cover 1. The set screw 23 of the windproof cover 1 may be placed into the screw hole 22 of the windproof cover 1 and may match with the rotational axle 18 of the windproof cover 1 for fixing the rotational axle 18 of the windproof cover 1 to keep the rotational axle 18 stable and undetached.

Figure 5:
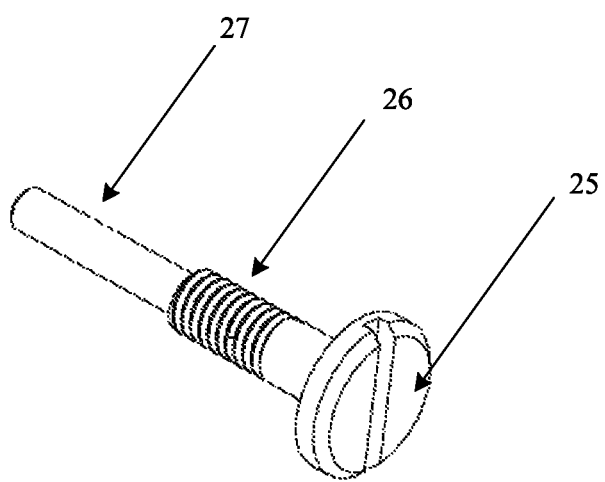
FIG. 5 illustrates a rotational axle of the windproof cover of an exemplary windproof cover unit consistent with the embodiments of the present disclosure.

As shown in FIG. 5, the rotational axle 18 of the windproof cover 1 may include a nut 25, a threaded part 26 in the middle of the rotational axle, a connection part between the nut 25 and the threaded part 26, and a guide part 27 facing the nut and at the other end of the rotational axle 18 of the windproof cover 1. The rotational axle 18 of the windproof cover 1 may be arranged at the left end and the right end of the optical fiber fusion splicer. The threaded part 26 of the rotational axle 18 of the windproof cover 1 may match with the threaded part 26 of the windproof cover 1. The guide part 27 of the rotational axle may match with the location hole on the rotational axle of the windproof cover 1 to ensure the rotational axles at both ends are properly aligned, e.g., in one line. That is, axiality of the rotational axles may be ensured.

Figure 6A:
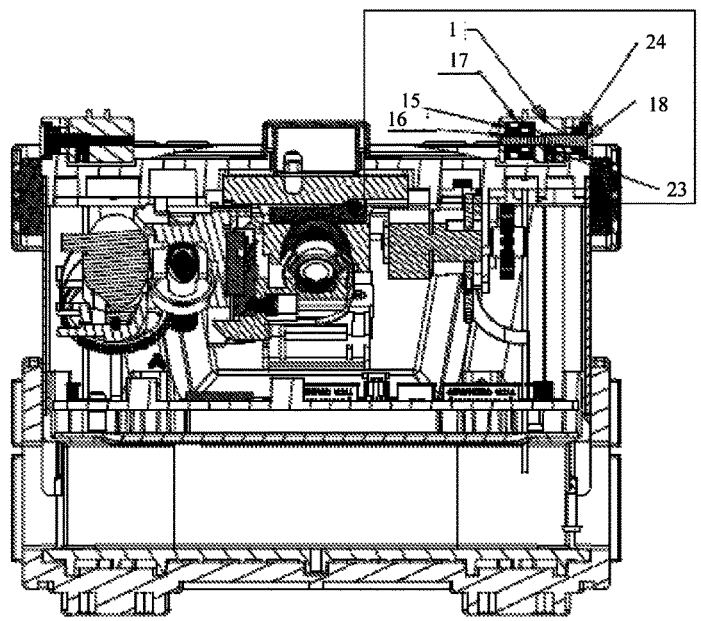
FIGS. 6A and 6B illustrate a cross-sectional view and a partially enlarged view of an exemplary assembly of the rotational axle consistent with the embodiments of the present disclosure.
Figure 6B:
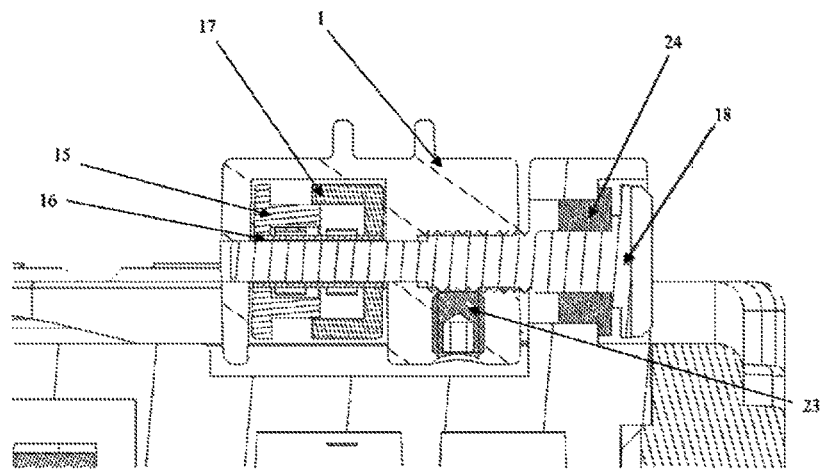
Figure 7:
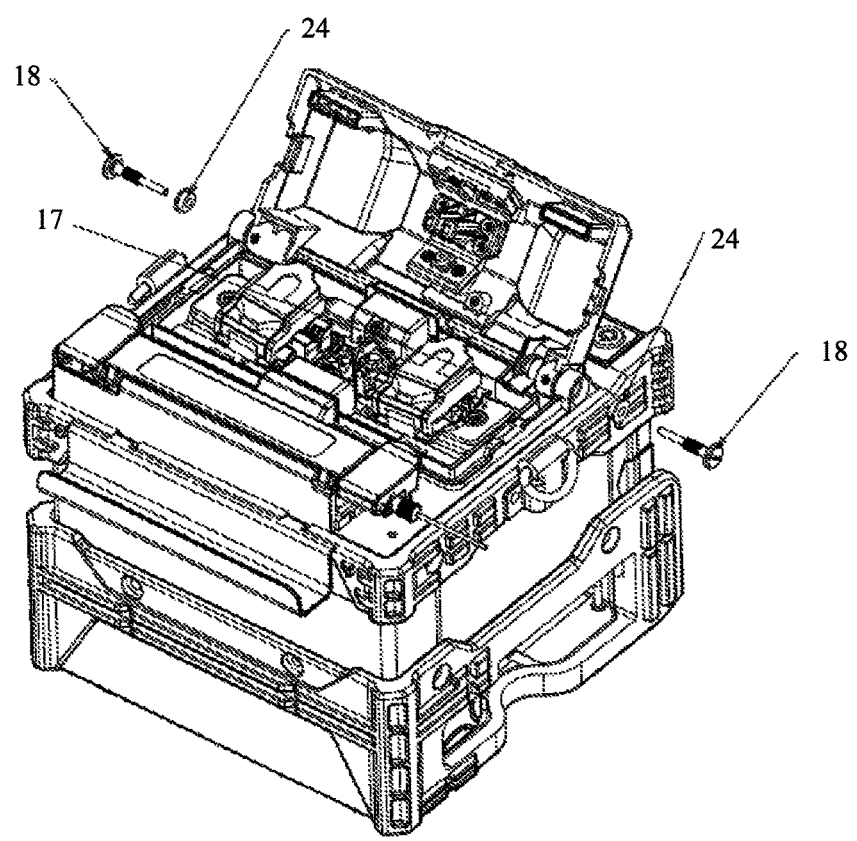
FIG. 7 illustrates the matching of the rotational axle of the windproof cover and the windproof cover of the windproof cover unit consistent with the embodiments of the present disclosure.
Figure 8:
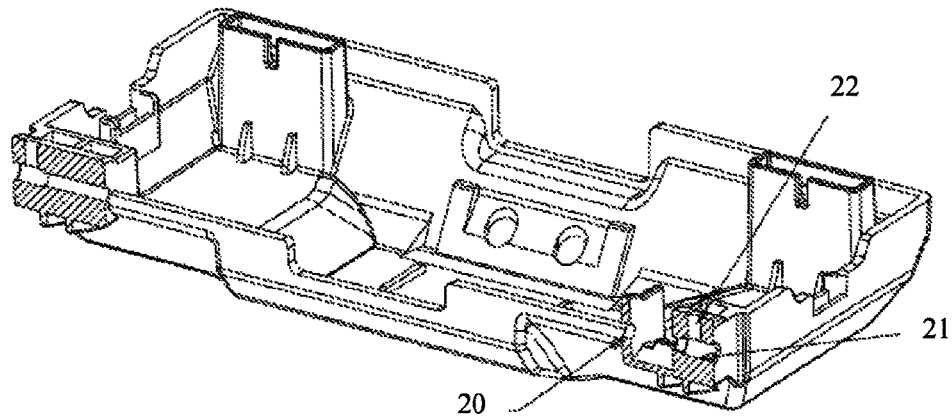
FIG. 8 illustrates an exemplary matching location of the rotational axle of a windproof cover and the windproof cover 1 of the windproof cover unit consistent with the embodiments of the present disclosure.
Figure 9:
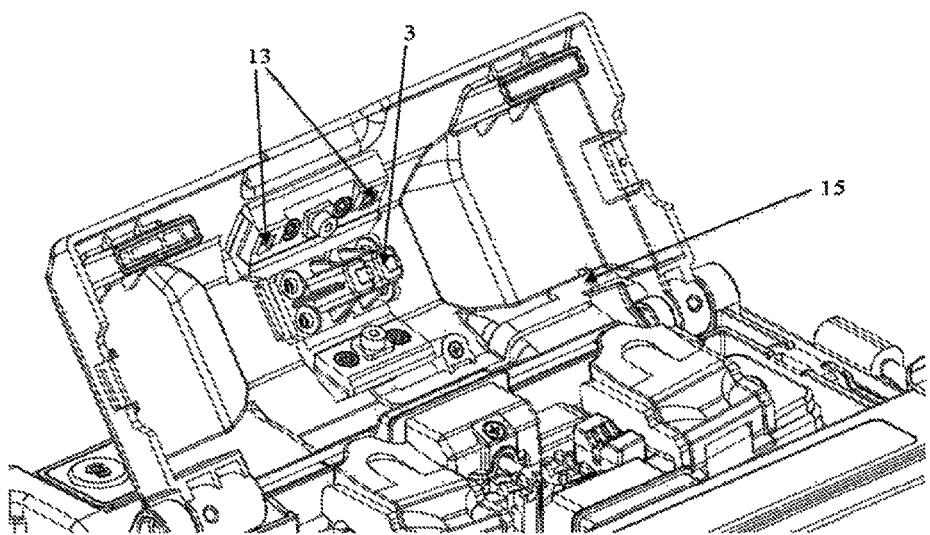
FIG. 9 illustrates a FPC baffle in a windproof cover of the windproof cover unit consistent with the embodiments of the present disclosure.

As shown in FIGS. 6A and 6B, the rotational axle 18 of the windproof cover 1 may include a step part on the inner side of the nut 25. FIG. 6B is an enlarged view of the circled portion in FIG. 6A. The size of the step part may be designed with reference to the flange bearing. The step part may press the flange bearing without affecting the rotation of the flange bearing. The step part may be similar to a circular screw head hole. Such similarity may enable the nut 25 of the rotational axle 18 of the windproof cover 1 to match with the flange bearing 24.

According to the present disclosure, during assembly, the guide part 27 of the rotational axle 18 of the windproof cover 1 may pass through the support frame 17 of the FPC threading groove, the FPC baffle 15, and the FPC winding sleeve 16 consecutively. The rotational axle 18 may be placed into the location hole 20 of the windproof cover 1.

In the disclosed windproof cover unit, the FPC cable of the red-light lamps on the windproof cover 1 may pass through the FPC baffle and may move along the FPC baffle. The FPC cable may further move downward at the rotational axle to connect with the main body of the optical fiber fusion splicer. The FPC cable may move around the FPC winding sleeve after passing through the FPC baffle to move downward and connect with the main body of the optical fiber fusion splicer.

The disclosed windproof cover unit may have several advantages.

The white-light lamps of the optical fiber fusion splicer can be configured inside the windproof cover 1 and the radiation angle of the white-light lamps can be designed according to the opening and closing angle of the windproof cover 1 to simplify the design structure and operation of the white-light lamps as well as the structure of the optical fiber fusion splicer.

Further, by utilizing the threaded rotational axle, location hole, set hole and set axle with adjustable tightness designed by the present disclosure to match with the windproof cover 1, free adjustments of the tightness of the rotational axle of the windproof cover 1 may be implemented. The stability of the rotation of the windproof cover 1 when opening the cover may be ensured. The moving of the windproof along the axial direction may be prevented. The rotational axle of the windproof cover 1 may be prevented from coming off. Thus, the stability and effectiveness of the windproof cover unit in long-term use may be ensured.

Further, by utilizing the FPC threading structure designed in the present disclosure to match with the windproof cover 1, the entire FPC threading structure may be arranged inside the cover, thus the FPC cable may be less susceptible to damages. The entire structure may be simple, convenient, and elaborately designed. No cover may be required for the FPC cable, and the appearance may be maintained without compromising the performance of the FPC cable.

In the present disclosure, reference terms, such as an embodiment, some embodiments, demonstration, specific demonstration or some demonstrations, refer to that the specific feature, structure, material or characteristic described in such embodiment or demonstration is involved in at least one embodiment or demonstration of the present disclosure. In the present manual, the schematic demonstration of the above terms is not necessarily about the same embodiment or demonstration. Besides, the described specific feature, structure, material or characteristic can be combined in one or multiple embodiments or demonstrations in an appropriate way. In addition, a skilled person in the art can integrate or combine the different embodiments or demonstrations as well as the features of different embodiments or demonstrations described in the present manual in the situation that no mutual contradiction is occurred.

Though the embodiments in the present disclosure have been presented and described above, it is understandable that the above embodiments are merely examples, which cannot be considered as limitations to the present disclosure; a person of ordinary skill in the art can change, modify, replace or transform the above embodiments within the scope of the present disclosure. The protection scope of the present disclosure shall be defined by the claims.

What is claimed is:

1. A windproof cover unit for optical fiber fusion splicer, comprising:
    a windproof cover,
    a mounting base unit,
    a flexible printed circuit (FPC) unit, and
    a rotational axle of the windproof cover,
    wherein the windproof cover comprises a protruding cover surface, an inner space, and a white-light lamp unit for providing illumination for the optical fiber fusion splicer in the inner space,
    the FPC unit comprises a FPC threading structure having a first part and a second part,
    the first part comprises a FPC baffle, the second part comprises a FPC winding sleeve and a support frame of the FPC threading groove, and the first part and the second part are connected by the rotational axle of the windproof cover,
    the FPC baffle is arranged inside the windproof cover and matches with a sidewall of the windproof cover by a certain interval to cover an FPC cable that is connected with red-light lamps and white-light lamps of the FPC unit,
    the support frame of the FPC threading groove comprises a fixed block and a circular block connecting with each other, the rotational axle of the windproof cover passes through a center hole of the circular block during assembly, and
    the FPC winding sleeve is located between the FPC baffle and the support frame of the FPC threading groove, the FPC winding sleeve is enclosed by a fastening of the support frame of the FPC threading groove and the FPC baffle, and the entire FPC threading structure is inside the cover.

2. The windproof cover unit according to claim 1, wherein the white-light lamp unit is arranged on the FPC unit, the FPC unit being between the mounting base unit and the inner space of the windproof cover and being fixed firmly inside the windproof cover by the mounting base unit.

3. The windproof cover unit according to claim 2, the mounting base unit comprising a mounting base, two lampshades, a pressing device base, and two pairs of retaining screws for the lampshade, wherein:
    the mounting base comprises a mounting plate in a center of the mounting base, the mounting place including different threaded holes matching with mounting holes on the inner surface of the windproof cover and mounting holes on the lampshades,
    the mounting plate includes lampshade support frames on both sides of the mounting plate, the two pairs of retaining screws connecting and fixing the lampshade support frames with the lampshades through the mounting holes on the lampshades, the pressing device base includes mounting holes on a bottom, the mounting holes forming a one-to-one correspondence to the mounting holes on the mounting plate such that the pressing device base is fixed onto the mounting plate, and the FPC unit comprises a reinforcement plate unit having several reinforcement plates for supporting the FPC cable that is connected with the red-light lamps and the white-light lamps emerged from surfaces of the reinforcement plates, wherein the reinforcement plate unit matches and connects with the lampshade support frames to jointly support and fix the white-light lamps and the red-light lamps.

4. The windproof cover unit according to claim 3, wherein a method for fixing the mounting base unit and the FPC unit comprises:

the red-light lamps and the white-light lamps matching with the mounting base;

the pressing device base pressing on the mounting base to fix and connect the lampshade support frames, the red-light lamps, the white-light lamps, and the mounting base to the inner surface of the windproof cover; and the lampshades being located in front of the red-light lamps and the white-light lamps.

5. The windproof cover unit according to claim 1, wherein the FPC cable of the red-light lamps or the white-light lamps on the windproof cover passes through the FPC baffle and moves along the FPC baffle, moves downward at the rotational axle of the windproof cover to connect with a main body of the optical fiber fusion splicer, and moves around the FPC winding sleeve after moving through the FPC baffle to move downward and connect with the main body of the optical fiber fusion splicer.

6. The windproof cover unit according to claim 5, further comprising a set screw of the windproof cover, wherein:

the windproof cover comprises a location hole of the windproof cover near an inner side of the windproof cover, a threaded hole of the windproof cover near an outer side of the windproof cover and on the same axle with the location hole of the windproof cover, and a screw hole of the windproof cover being perpendicularly to the threaded hole of the windproof cover;

the set screw of the windproof cover is placed into the screw hole of the windproof cover and matches with the rotational axle of the windproof cover for fixing the rotational axle of the windproof cover to keep the rotational axle stable and undetached;

the rotational axle of the windproof cover comprises a nut, a threaded part in a middle of the rotational axle, a connection part between the nut and the threaded part, and a guide part facing the nut and at another end of the rotational axle of the windproof cover;

the rotational axle of the windproof cover is configured at a left end and a right end of the optical fiber fusion splicer, and the threaded part of the rotational axle of the windproof cover matches with the threaded part of the windproof cover; and the guide part of the rotational axle matches with a location hole on the rotational axle of the windproof cover to ensure the rotational axle at both ends are aligned with each other.

7. The windproof cover unit according to claim 6, the rotational axle of the windproof cover comprising a step part on an inner side of the nut, wherein:

a size of the step part is designed with reference to a flange bearing, the step part pressing the flange bearing without affecting a rotation of the flange bearing; and the step part enables the nut of the rotational axle of the windproof cover to match with the flange bearing.

8. The windproof cover unit according to claim 7, wherein during assembly, the guide part of the rotational axle of the windproof cover passes through the support frame of the FPC threading groove, the FPC baffle, and the FPC winding sleeve consecutively, and is placed into the location hole of the windproof cover.

9. The windproof cover unit according to claim 8, wherein the FPC cable of the red-light lamps on the windproof cover passes through the FPC baffle and moves along the FPC baffle, moves downward at the rotational axle to connect with the main body of the optical fiber fusion splicer, and moves around the FPC winding sleeve after moving through the FPC baffle to move downward and connect with the main body of the optical fiber fusion splicer.

10. A windproof cover unit for optical fiber fusion splicer, comprising:

a windproof cover,
a mounting base unit,
a flexible printed circuit (FPC) unit, and
a rotational axle of the windproof cover, wherein the windproof cover comprises a protruding cover surface, an inner space, and a white-light lamp unit for providing illumination for the optical fiber fusion splicer in the inner space, the white-light lamp unit is arranged on the FPC unit, the FPC unit is between the mounting base unit and the inner space of the windproof cover and is fixed firmly inside the windproof cover by the mounting base unit, the mounting base unit comprises a mounting base, two lampshades, a pressing device base, and two pairs of retaining screws for the lampshade, wherein:

the mounting base comprises a mounting plate in a center of the mounting base, the mounting place including different threaded holes matching with mounting holes on the inner surface of the windproof cover and mounting holes on the lampshades, the mounting plate includes lampshade support frames on both sides of the mounting plate, the two pairs of retaining screws connecting and fixing the lampshade support frames with the lampshades through the mounting holes on the lampshades, the pressing device base includes mounting holes on a bottom, the mounting holes forming a one-to-one correspondence to the mounting holes on the mounting plate such that the pressing device base is fixed onto the mounting plate, and the FPC unit comprises a reinforcement plate unit having several reinforcement plates for supporting an FPC cable that is connected with red-light lamps and white-light lamps in the FPC unit emerged from surfaces of the reinforcement plates, wherein the reinforcement plate unit matches and connects with the lampshade support frames to jointly support and fix the white-light lamps and the red-light lamps.

11. The windproof cover unit according to claim 10, wherein a method for fixing the mounting base unit and the FPC unit comprises:

the red-light lamps and the white-light lamps matching with the mounting base;

the pressing device base pressing on the mounting base to fix and connect the lampshade support frames, the red-light lamps, the white-light lamps, and the mounting base to the inner surface of the windproof cover; and the lampshades being located in front of the red-light lamps and the white-light lamps.

12. A windproof cover unit for optical fiber fusion splicer, comprising:
a windproof cover,
a mounting base unit,
a flexible printed circuit (FPC) unit, and
a rotational axle of the windproof cover,
wherein the windproof cover comprises a protruding cover surface, an inner space, and a white-light lamp unit for providing illumination for the optical fiber fusion splicer in the inner space,
the FPC unit comprises a FPC threading structure having a first part and a second part, and
the first part comprises a FPC baffle, the second part comprises a FPC winding sleeve and a support frame of the FPC threading groove, and the first part and the second part are connected by the rotational axle of the windproof cover.

13. The windproof cover unit according to claim 12, wherein:
the FPC baffle is arranged inside the windproof cover and matches with a sidewall of the windproof cover by a certain interval to cover an FPC cable that is connected with red-light lamps and white-light lamps of the FPC unit,
the support frame of the FPC threading groove comprises a fixed block and a circular block connecting with each other, the rotational axle of the windproof cover passes through a center hole of the circular block during assembly, and
the FPC winding sleeve is located between the FPC baffle and the support frame of the FPC threading groove, the FPC winding sleeve is enclosed by a fastening of the support frame of the FPC threading groove and the FPC baffle, and the entire FPC threading structure is inside the cover.

14. The windproof cover unit according to claim 13, wherein the FPC cable of the red-light lamps or the white-light lamps on the windproof cover passes through the FPC baffle and moves along the FPC baffle, moves downward at the rotational axle of the windproof cover to connect with a main body of the optical fiber fusion splicer, and moves around the FPC winding sleeve after moving through the FPC baffle to move downward and connect with the main body of the optical fiber fusion splicer.

15. The windproof cover unit according to claim 14, further comprising a set screw of the windproof cover, wherein:
the windproof cover comprises a location hole of the windproof cover near an inner side of the windproof cover, a threaded hole of the windproof cover near an outer side of the windproof cover and on the same axle with the location hole of the windproof cover, and a screw hole of the windproof cover being perpendicularly to the threaded hole of the windproof cover;
the set screw of the windproof cover is placed into the screw hole of the windproof cover and matches with the rotational axle of the windproof cover for fixing the rotational axle of the windproof cover to keep the rotational axle stable and undetached;

the rotational axle of the windproof cover comprises a nut, a threaded part in a middle of the rotational axle, a connection part between the nut and the threaded part, and a guide part facing the nut and at another end of the rotational axle of the windproof cover;
the rotational axle of the windproof cover is configured at a left end and a right end of the optical fiber fusion splicer, and the threaded part of the rotational axle of the windproof cover matches with the threaded part of the windproof cover; and
the guide part of the rotational axle matches with a location hole on the rotational axle of the windproof cover to ensure the rotational axle at both ends are aligned with each other.

16. The windproof cover unit according to claim 15, the rotational axle of the windproof cover comprising a step part on an inner side of the nut, wherein:
a size of the step part is designed with reference to a flange bearing, the step part pressing the flange bearing without affecting a rotation of the flange bearing; and
the step part enables the nut of the rotational axle of the windproof cover to match with the flange bearing.

17. The windproof cover unit according to claim 16, wherein during assembly, the guide part of the rotational axle of the windproof cover passes through the support frame of the FPC threading groove, the FPC baffle, and the FPC winding sleeve consecutively, and is placed into the location hole of the windproof cover.

18. The windproof cover unit according to claim 17, wherein the FPC cable of the red-light lamps on the windproof cover passes through the FPC baffle and moves along the FPC baffle, moves downward at the rotational axle to connect with the main body of the optical fiber fusion splicer, and moves around the FPC winding sleeve after moving through the FPC baffle to move downward and connect with the main body of the optical fiber fusion splicer.

19. The windproof cover unit according to claim 13, wherein the white-light lamp unit is arranged on the FPC unit, the FPC unit being between the mounting base unit and the inner space of the windproof cover and being fixed firmly inside the windproof cover by the mounting base unit.

20. The windproof cover unit according to claim 19, the mounting base unit comprising a mounting base, two lampshades, a pressing device base, and two pairs of retaining screws for the lampshade, wherein:
the mounting base comprises a mounting plate in a center of the mounting base, the mounting place including different threaded holes matching with mounting holes on the inner surface of the windproof cover and mounting holes on the lampshades,
the mounting plate includes lampshade support frames on both sides of the mounting plate, the two pairs of retaining screws connecting and fixing the lampshade support frames with the lampshades through the mounting holes on the lampshades,
the pressing device base includes mounting holes on a bottom, the mounting holes forming a one-to-one correspondence to the mounting holes on the mounting plate such that the pressing device base is fixed onto the mounting plate, and
the FPC unit comprises a reinforcement plate unit having several reinforcement plates for supporting the FPC cable that is connected with the red-light lamps and the white-light lamps emerged from surfaces of the reinforcement plates, wherein the reinforcement plate unit matches and connects with the lampshade support frames to jointly support and fix the white-light lamps and the red-light lamps.

\* \* \* \* \*